(12) United States Patent
Chari et al.

(10) Patent No.: US 9,137,265 B2
(45) Date of Patent: *Sep. 15, 2015

(54) GENERATING ROLE-BASED ACCESS CONTROL POLICIES BASED ON DISCOVERED RISK-AVERSE ROLES

(71) Applicant: International Business Machines Corporation, Armonk, NY (US)

(72) Inventors: Suresh N. Chari, Tarrytown, NY (US); Ian M. Molloy, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 53 days.

This patent is subject to a terminal disclaimer.

(21) Appl. No.: 13/969,533

(22) Filed: Aug. 17, 2013

(65) Prior Publication Data
US 2014/0196104 A1    Jul. 10, 2014

Related U.S. Application Data

(63) Continuation of application No. 13/800,147, filed on Mar. 13, 2013.

(60) Provisional application No. 61/748,778, filed on Jan. 4, 2013.

(51) Int. Cl.
*H04L 29/06* (2006.01)

(52) U.S. Cl.
CPC .............. *H04L 63/20* (2013.01); *H04L 63/102* (2013.01)

(58) Field of Classification Search
CPC ..... H04L 63/10; H04L 63/101; H04L 63/102; H04L 63/104; H04L 63/105; H04L 63/20
USPC .......................................................... 726/1, 27
See application file for complete search history.

(56) References Cited

U.S. PATENT DOCUMENTS

2008/0288330 A1 *  11/2008  Hildebrand et al. ............ 705/10
2011/0126111 A1      5/2011  Gill et al.
(Continued)

OTHER PUBLICATIONS

Chari et al., "Practical Risk Aggregation in RBAC Models," Proceedings of the 17th ACM Symposium on Access Control Models and Techniques (SACMAT'12), Jun. 2012, pp. 117-118.
(Continued)

*Primary Examiner* — Justin T Darrow
(74) *Attorney, Agent, or Firm* — Yee & Associates, P.C.; Anne Dougherty

(57) ABSTRACT

Generating role-based access control policies is provided. A user-permission relation is generated by extracting users and permissions assigned to each of the users from a stored access control policy. A user-attribute relation is generated by mapping the users to attributes describing the users. A permission-attribute relation is generated by mapping the permissions to attributes describing the permissions. The set of risk-averse roles, assignment of the set of risk-averse roles to the users, and assignment of the permissions to the set of risk-averse roles are determined based on applying a risk-optimization function to the generated user-permission relation, the generated user-attribute relation, and the generated permission-attribute relation. A role-based access control policy that minimizes a risk profile of the set of risk-averse roles, the assignment of the set of risk-averse roles to the users, and the assignment of the permissions to the set of risk-averse roles is generated.

20 Claims, 9 Drawing Sheets

(56) References Cited

U.S. PATENT DOCUMENTS

2012/0060207 A1 3/2012 Mardikar et al.
2012/0246098 A1 9/2012 Chari et al.
2014/0196103 A1 7/2014 Chad et al.

OTHER PUBLICATIONS

Frank et al., "A Probabilistic Approach to Hybrid Role Mining," Proceedings of the 16th ACM Conference on Computer and Communications Security (CCS'09), Nov. 2009, pp. 101-111.

Lu et al., "Optimal Boolean Matrix Decomposition: Application to Role Engineering," Proceedings of the 24th IEEE International Conference on Data Engineering (ICDE 2008), Apr. 2008, pp. 297-306.

Molloy et al., "Risk-Based Security Decisions Under Uncertainty," Proceedings of the Second ACM Conference on Data and Application Security and Privacy (CODASPY'12), Feb. 2012, pp. 157-168.

Singh et al., "A Unified View of Matrix Factorization Models", Machine Learning and Knowledge Discovery in Databases: Proceedings of the European Conference on Machine Learning and Principles and Practice of Knowledge Discovery in Databases (ECML/PKDD 2008), Sep. 2008, pp. 358-373.

Office Action dated Dec. 5, 2014, regarding U.S. Appl. No. 13/800,147, 17 pages.

Notice of Allowance dated May 7, 2015, regarding U.S. Appl. No. 13/800,147, 12 pages.

\* cited by examiner

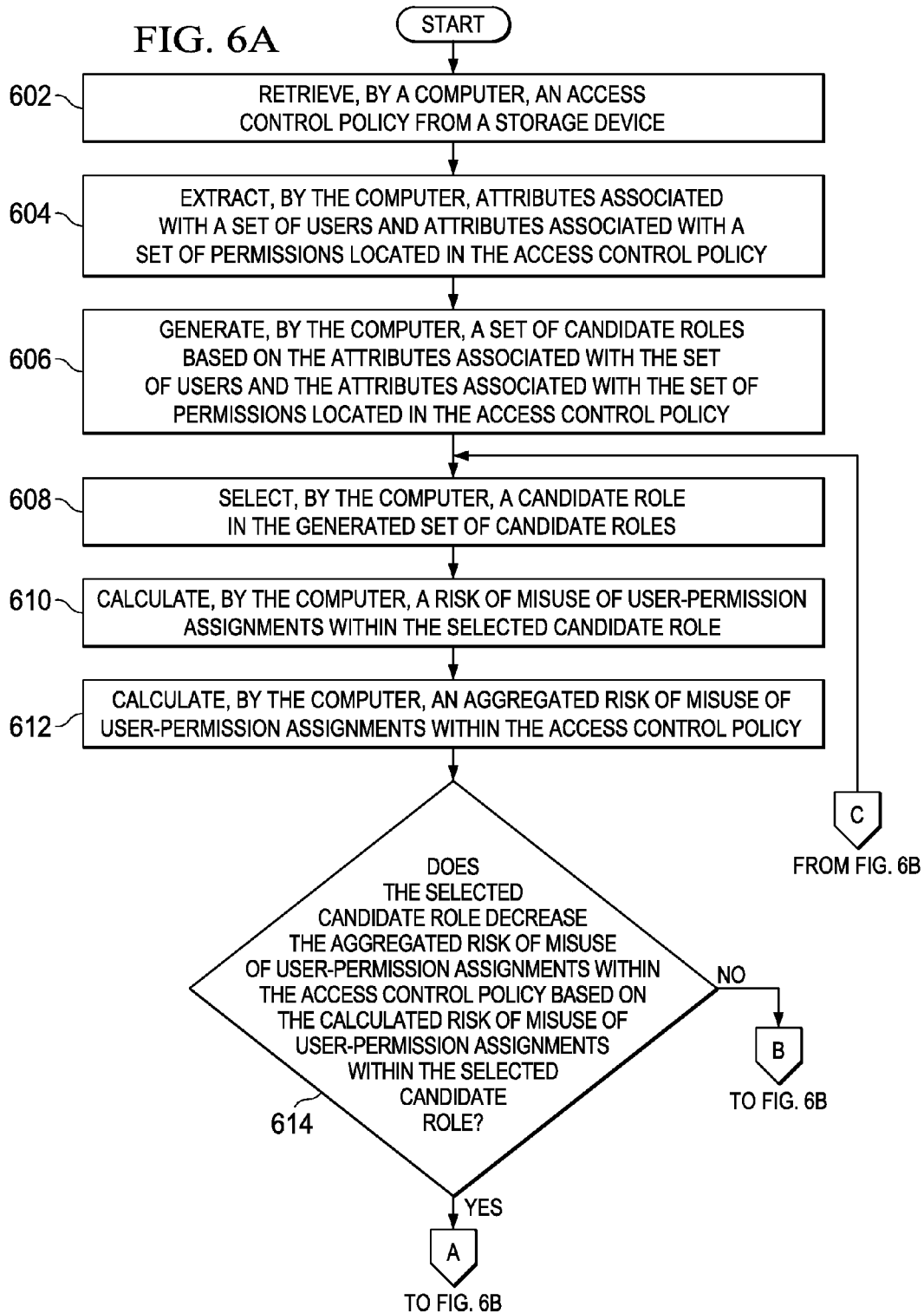

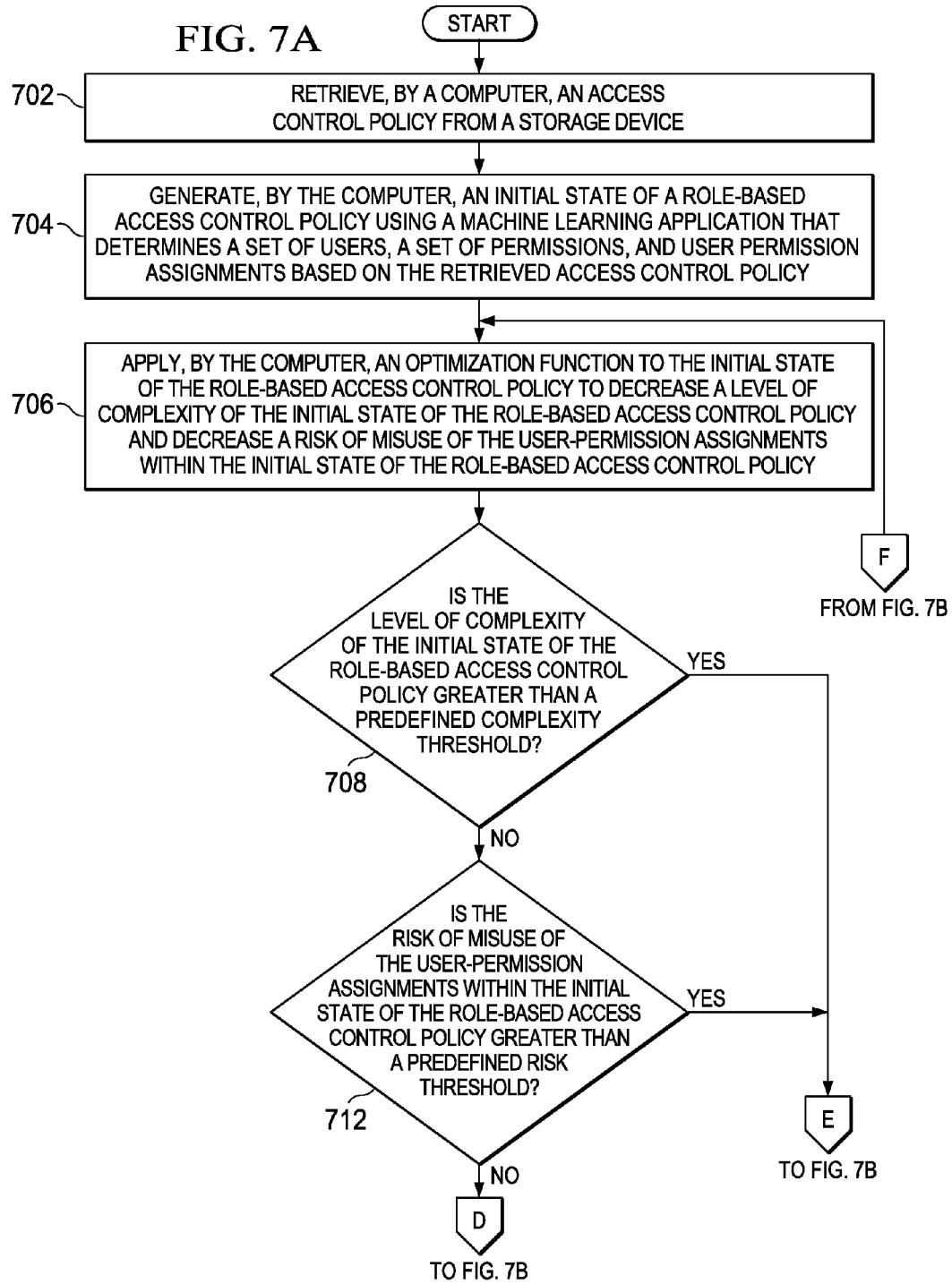

GENERATING ROLE-BASED ACCESS CONTROL POLICIES BASED ON DISCOVERED RISK-AVERSE ROLES

This application is a continuation of U.S. patent application Ser. No. 13/800,147, filed on Mar. 13, 2013, which claims the benefit of U.S. Provisional Patent Application No. 61/748,778, filed on Jan. 4, 2013.

BACKGROUND

1. Field

The disclosure relates generally to access control policies and more specifically to generating role-based access control policies that minimize a risk profile of resulting risk-averse roles and assignments to those risk-averse roles.

2. Description of the Related Art

Effective risk management in an enterprise or organization involves quantifying the risk that an access control policy and enforcement of the access control policy poses to the enterprise or organization and the ability of the enterprise or organization to perform its mission. Access control policies are a primary line of defense for securing sensitive and valuable resources of an enterprise or organization. These access control policies dictate the types of actions users, such as, for example, humans, hardware devices, software applications, and networks, are allowed to perform on the protected resources. Errors in or mis-configuration of access control policies may allow malicious insiders or intruders to abuse the access control policies and perform unintended or undesirable actions on the protected resources. In addition, a user may combine, for example, several access permissions assigned to the user in an abusive way, which may produce a substantially higher degree of harm to an enterprise or organization than the user using a single permission in an abusive way.

To mitigate the impact of these risks, a common approach is to analyze the access control policy and assess the risk that is posed to the enterprise or organization. To accomplish this, one must consider the set of all permission assignments given to the user and then assess the potential impact of the misuse or abuse of these assigned permissions. Typically, the process of assessing the risk that is inherent in an access control policy is performed after the access control policy has been defined. One first defines an access control policy and then does a risk assessment to see if the resulting access control policy is acceptable. However, this approach to risk assessment is suboptimal because most access control policy definitions are aimed at optimizing the size and complexity of the access control policy, which is counter to risk management.

SUMMARY

According to one illustrative embodiment, a computer system for generating role-based access control policies that minimize a risk profile of resulting risk-averse roles and assignments to those risk-averse roles is provided. A user-permission relation is generated from a stored access control policy by extracting users and permissions assigned to each of the users from the stored access control policy. A user-attribute relation is generated by mapping the users to attributes describing each of the users. A permission-attribute relation is generated by mapping the permissions to attributes describing each of the permissions. A set of risk-averse roles, assignment of the set of risk-averse roles to the users, and assignment of the permissions to the set of risk-averse roles is determined based on applying a risk-optimization function to the generated user-permission relation, the generated user-attribute relation, and the generated permission-attribute relation. Then, a role-based access control policy is generated that minimizes a risk profile of the set of risk-averse roles, the assignment of the set of risk-averse roles to the users, and the assignment of the permissions to the set of risk-averse roles. According to another illustrative embodiment, a computer program product for generating role-based access control policies that minimize a risk profile of resulting risk-averse roles and assignments to those risk-averse roles is provided.

BRIEF DESCRIPTION OF THE SEVERAL VIEWS OF THE DRAWINGS

FIG. 6A and FIG. 6B are a flowchart illustrating another process for generating a role-based access control policy based on a set of candidate roles added to an access control policy in accordance with an illustrative embodiment; and FIG. 7A and FIG. 7B are a flowchart illustrating a process for generating a role-based access control policy based on an initial role-based access control policy generated by a machine learning application in accordance with an illustrative embodiment.

DETAILED DESCRIPTION

Figure 1:
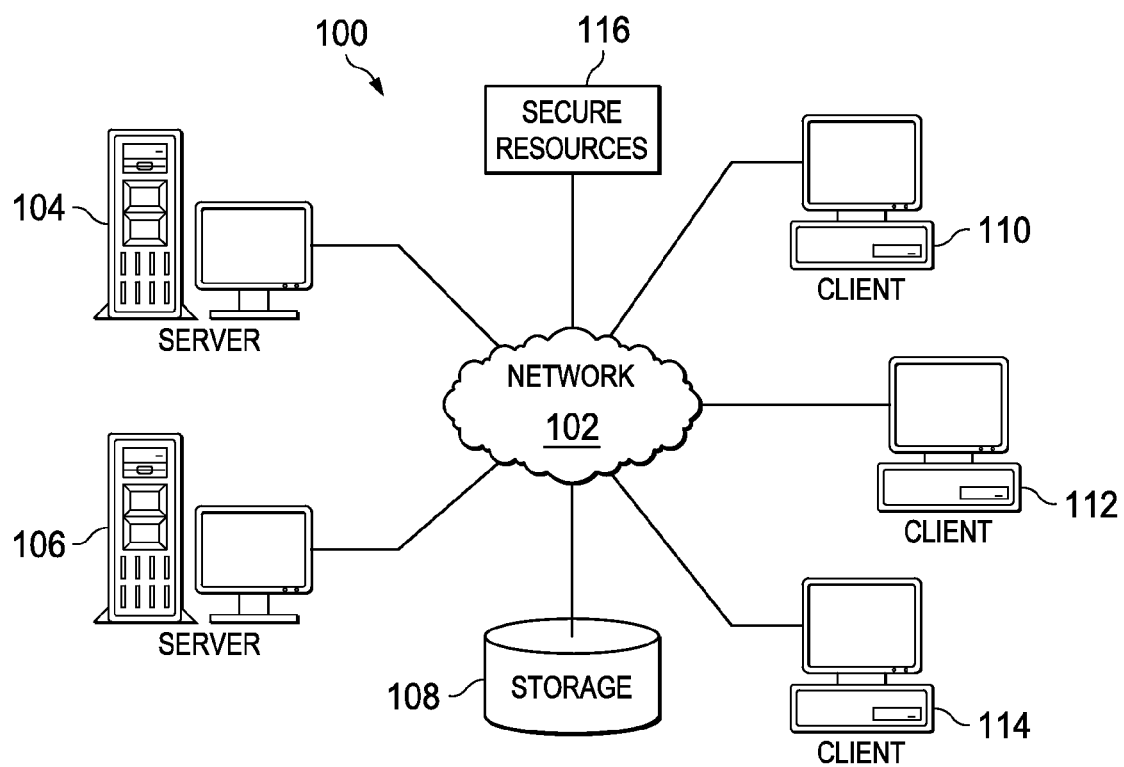
FIG. 1 is a pictorial representation of a network of data processing systems in which illustrative embodiments may be implemented.

As will be appreciated by one skilled in the art, aspects of the illustrative embodiments may be embodied as a computer system or computer program product. Accordingly, aspects of the illustrative embodiments may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the illustrative embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can store a program for use by or in connection with an instruction execution system, apparatus, or device. In addition, a computer readable storage medium is a non-transitory computer readable storage medium and does not include a propagation medium, such as a signal or carrier wave.

A computer readable signal medium may include a propagated data signal with computer readable program code embodied therein, for example, in baseband or as part of a carrier wave. Such a propagated signal may take any of a variety of forms, including, but not limited to, electro-magnetic, infra-red, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the illustrative embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the illustrative embodiments are described below with reference to flowchart illustrations and/or block diagrams of computer systems and computer program products according to illustrative embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
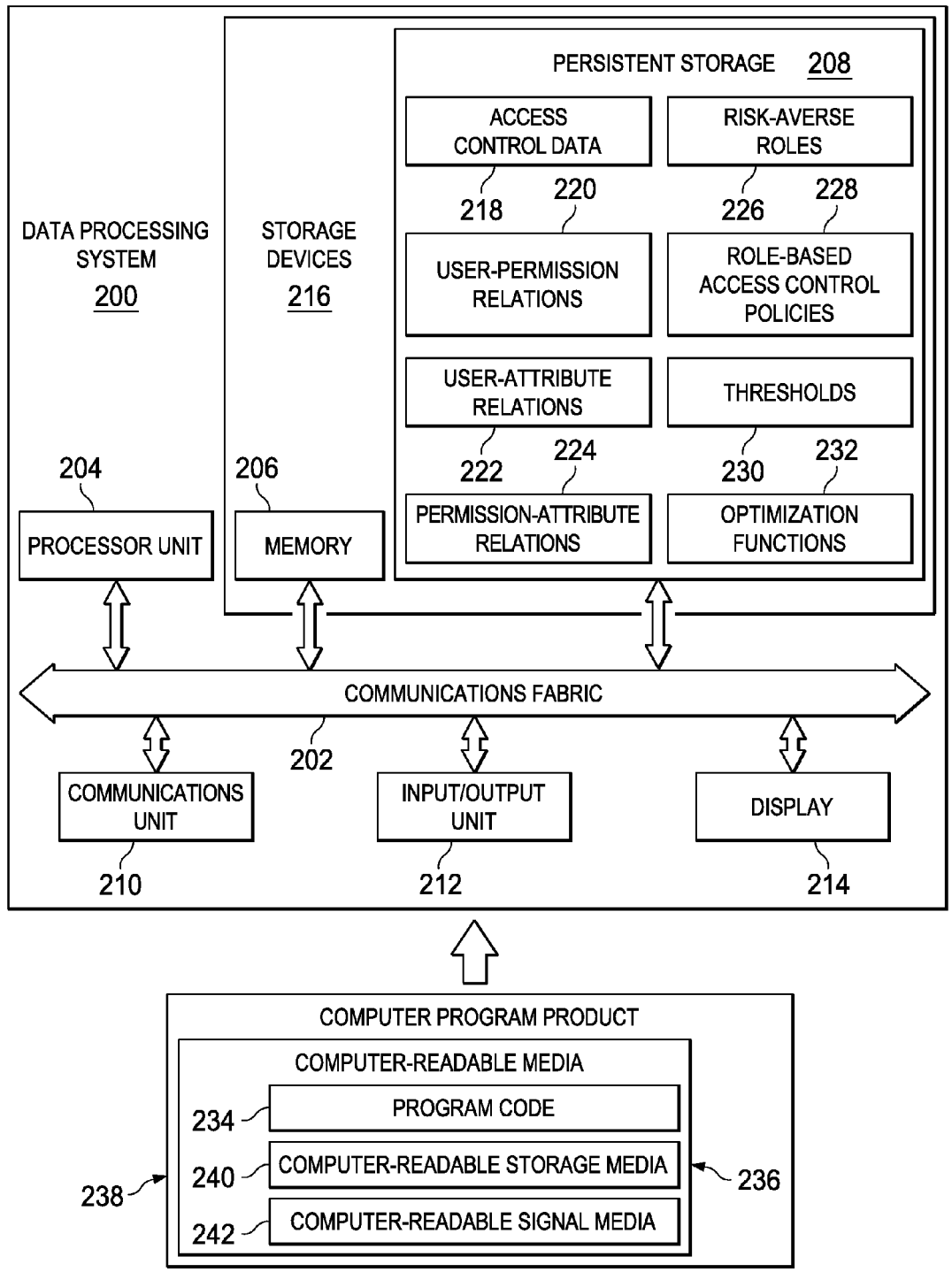
FIG. 2 is a diagram of a data processing system in which illustrative embodiments may be implemented.
Figure 3:
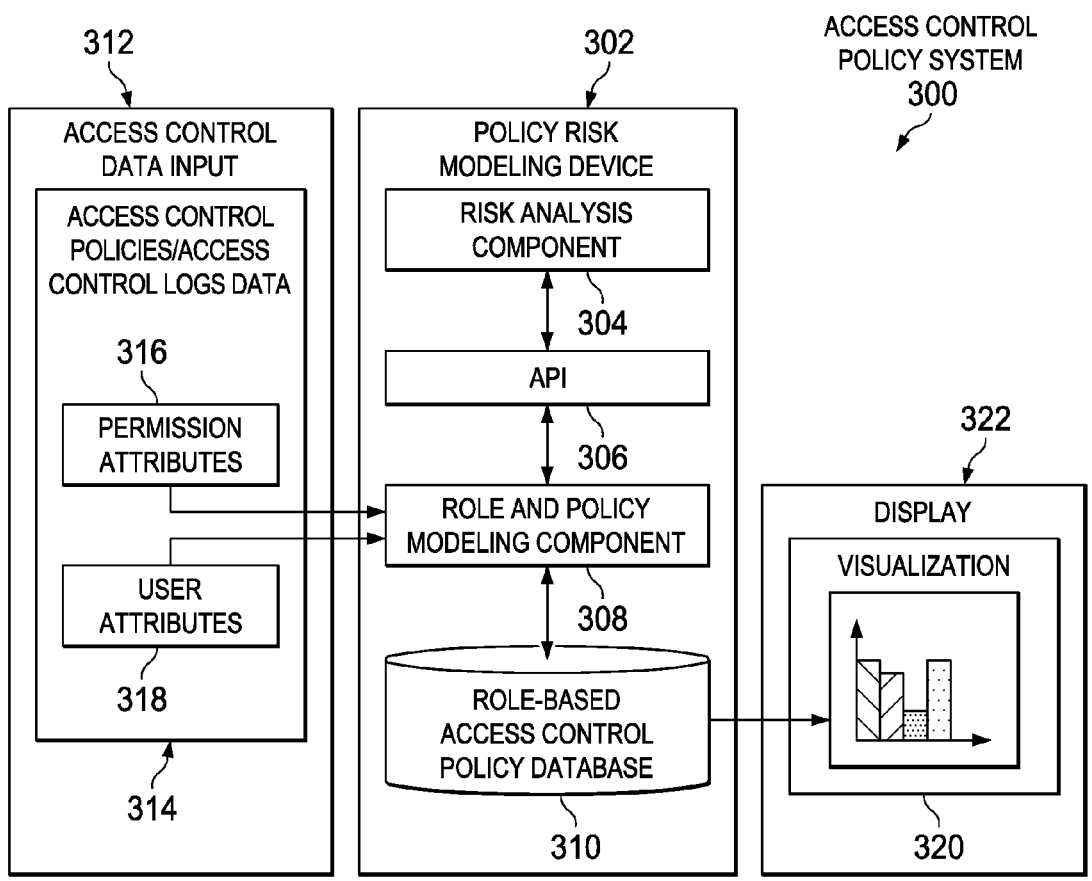
FIG. 3 is a diagram illustrating an example of an access control policy system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers and other devices in which the illustrative embodiments may be implemented. Network data processing system 100 contains network 102, which is the medium used to provide communications links between the computers and the other various devices connected together within network data processing system 100. Network 102 may include connections, such as wire communication links, wireless communication links, or fiber optic cables.

In the depicted example, server 104 and server 106 connect to network 102, along with storage unit 108. Server 104 and server 106 may be, for example, server computers with high speed connections to network 102. In addition, server 104 and/or server 106 may generate, for example, role-based access control (RBAC) policies, which an enterprise or organization may use to control access to secure resources 116 connected to network 102. A secure resource may be, for example, a network, a document, a software application, or a hardware device in network data processing system 100 that has restricted access by only authorized users. An authorized user may be, for example, a human, a software application, a hardware device, or a network. Each authorized user is assigned a particular risk-averse role that includes a set of one or more permissions.

A role is a set of users with their assigned permissions to perform particular tasks or actions on one or more secure resources. Alternatively, a role may be viewed as an intermediary between a set of users and a set of permissions. A risk-averse role is a role that has a level of risk associated with it. A permission is a privilege or right to access a secure resource. The access privilege or access right may grant, for example, a user assigned to that particular access privilege or access right the ability to read, write, delete, and/or modify a secure document. As another example, the access privilege or access right may grant an assigned user the ability to access and use a secure hardware device, software application, or network, such as a secure computer, financial application, or storage area network. A risk is the expected negative impact of the calculated probability that a user will misuse or abuse an assigned permission.

Clients 110, 112, and 114 also connect to network 102. Clients 110, 112, and 114 are clients to server 104 and/or server 106. In the depicted example, server 104 and/or server 106 may provide information, such as boot files, operating system images, and applications to clients 110, 112, and 114. Users of clients 110, 112, and 114 utilize clients 110, 112, and 114 to access secure resources 116, which are protected by the role-based access control policies generated by server 104 and/or server 106.

Clients 110, 112, and 114 may be, for example, personal computers, network computers, and/or portable computers, such as laptop computers, with wire communication links to network 102. In addition, clients 110, 112, and 114 may be mobile data processing systems, such as cellular telephones, smart phones, personal digital assistants, gaming devices, or handheld computers, with wireless communication links to network 102. It should be noted that clients 110, 112, and 114 may represent any combination of computers and mobile data processing systems connected to network 102.

Storage unit 108 is a network storage device capable of storing data in a structured or unstructured format. Storage unit 108 may provide, for example, storage of: names and identification numbers of a plurality of users; user history data or access control logs for each of the plurality of users that may include listings of previously accessed secure resources, when the secure resources were accessed, and what actions were performed on the secure resources by the users; relationships between each of the plurality of users and their assigned permissions to access secure resources; attributes that describe each of the plurality of users; and attributes that describe each of the assigned permissions. Furthermore, storage unit 108 may store other data, such as authentication data that may include user names, passwords, and/or biometric data associated with each of the plurality of users and system administrators of the access control policy service.

Also, it should be noted that network data processing system 100 may include any number of additional server devices, client devices, and other devices not shown. Program code located in network data processing system 100 may be stored on a computer recordable storage medium and downloaded to a computer or other device for use. For example, program code may be stored on a computer recordable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a computer, such as server 104 or client 110 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications or programs that may be loaded into memory 206. Processor unit 204 may be a set of one or more processors or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device does not include a non-statutory propagation medium. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores access control data 218, user-permission relations 220, user-attribute relations 222, permission-attribute relations 224, risk-averse roles 226, role-based access control policies 228, thresholds 230, and optimization functions 232. Of course, persistent storage 208 may store any type of information or data utilized by the different illustrative embodiments.

Access control data 218 may include, for example, previously implemented access control policies used by an enterprise or organization. The previously implemented access control policies may be, for example, discretionary and/or mandatory access control policies. A discretionary access control policy permits specified users to access secure resources, such as secure resources 116 in FIG. 1, according to permissions assigned to each of the specified users. A mandatory access control policy assigns security classifications to each of the secure resources and allows access only by users with distinct levels of security clearance. In addition, access control data 218 may include user access logs or user access histories for each of a plurality of users. The user access logs may include information, such as which secure resources were accessed by a user, when the secure resources were accessed by the user, and what actions were performed on the secure resources by the user.

User-permission relations 220 define relationships between each of the users and their associated permissions to access one or more secure resources to perform their assigned duties or tasks within an enterprise or organization. User-attribute relations 222 define relationships between each of the users and attributes that describe each of the users, such as, for example, a job title, assigned department within the enterprise or organization, assigned security clearance level, and/or geographic location of each of the users. Permission-attribute relations 224 define relationships between each permission and attributes that describe each of the permissions, such as, for example, a sensitivity of each of the permissions. A sensitivity of a permission defines a level of damage that may be caused by an abuse or misuse of that particular permission by a user.

Risk-averse roles 226 define roles having a minimized level of risk that a user will misuse or abuse a permission assigned to a particular role. Role-based access control policies 228 define control policies that authorize user access to secure resources based on a set of one or more roles assigned to a particular user and the access permissions assigned to those roles. Thresholds 230 define upper bounds or maximum limits on a level of risk that a role-based access control policy may pose to an enterprise or organization. Thresholds 230 may be, for example, predefined threshold values set by the enterprise or organization or by a system administrator. Thresholds 230 also may include threshold values for a maximum complexity level of role-based access control policies. However, when relating to the complexity level of role-based access control policies, illustrative embodiments may view thresholds 230 more as a weighted tradeoff between two or more risk criteria, such as the complexity of a generated role-based access control policy and the risk of the generated role-based access control policy, rather than a threshold value.

Optimization functions 232 are predefined mathematical functions. Data processing system 200 utilizes optimization functions 232 to optimize a stored access control policy by decreasing an aggregate risk level of the access control policy below a predefined risk threshold level and decreasing the level of complexity of the access control policy below a predefined complexity threshold level. In addition, data processing system 200 may utilize optimization functions 232 to minimize a number of changes to user-permission assignments between the stored access control policy and the generated role-based access control policy by using a constrained distance function.

Communications unit 210, in this example, provides for communication with other data processing systems or devices. Communications unit 210 may provide communications through the use of either or both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), bluetooth technology, global system for mobile communications (GSM), code division multiple access (CDMA), second-generation (2G), third-generation (3G), fourth-generation (4G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user. In addition, display 214 may provide touch screen capabilities.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer implemented instructions, which may be located in a memory, such as memory 206. These instructions are referred to as program code, computer usable program code, or computer readable program code that may be read and run by a processor in processor unit 204. The program code, in the different embodiments, may be embodied on different physical computer readable storage devices, such as memory 206 or persistent storage 208.

Program code 234 is located in a functional form on computer readable media 236 that is selectively removable and may be loaded onto or transferred to data processing system 200 for running by processor unit 204. Program code 234 and computer readable media 236 form computer program product 238. In one example, computer readable media 236 may be computer readable storage media 240 or computer readable signal media 242. Computer readable storage media 240 may include, for example, an optical or magnetic disc that is inserted or placed into a drive or other device that is part of persistent storage 208 for transfer onto a storage device, such as a hard drive, that is part of persistent storage 208. Computer readable storage media 240 also may take the form of a persistent storage, such as a hard drive, a thumb drive, or a flash memory that is connected to data processing system 200. In some instances, computer readable storage media 240 may not be removable from data processing system 200.

Alternatively, program code 234 may be transferred to data processing system 200 using computer readable signal media 242. Computer readable signal media 242 may be, for example, a propagated data signal containing program code 234. For example, computer readable signal media 242 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 234 may be downloaded over a network to persistent storage 208 from another device or data processing system through computer readable signal media 242 for use within data processing system 200. For instance, program code stored in a computer readable storage media in a server data processing system may be downloaded over a network from the server to data processing system 200. The data processing system providing program code 234 may be a server computer, a client computer, or some other device capable of storing and transmitting program code 234.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 240 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

In the course of developing illustrative embodiments, it was discovered that mining was a prevalent process for obtaining role-based access control policies from permissions previously assigned to users. The previous process of mining, where the goal was to optimize the resulting role-based access control policy, tried to cram as many permissions into a role as possible. However, cramming as many permissions into a role as possible runs counter to the principle of least privilege and ignores the notion of risk mitigation. The principle of least privilege limits access to the minimal level that will allow normal functioning. In other words, users should be assigned the fewest access permissions consistent with their assigned work. Thus, the principle of least privilege limits the potential damage of a security breach, whether accidental or malicious.

Illustrative embodiments define the problem of automatically mining roles with constraints on the maximum risk levels that a resulting role-based access control policy can have. The problem is to mine access control policies that enable users to perform their assigned work while minimizing the aggregate risk to the enterprise or organization due to potential misuse and/or attack from compromised accounts, malicious insiders, and incomplete coverage of access control policies. A few limited tools exist that enable the system administrator to mine access control policies, but these tools do not take into account the level of risk in the assignment of users to roles or access permissions to roles. The result is an ad-hoc and inefficient process for creating access control policies.

Illustrative embodiments mine existing access control policies, user access logs, user trust data, and permission sensitivity data to generate a role-based access control policy that enables necessary access to secure resources by users and minimizes the operational risk of the newly generated role-based access control policy. Thus, illustrative embodiments address the shortcomings of existing tools. Operational risk may be defined in several ways. For example, the operational risk may define the total number of permissions assigned to each user, the total number of permissions assigned to each risk-averse role, the level of sensitivity of each assigned permission, the level of trust of each user, and any mutually exclusive rule between assigned permissions. The level of trust of a user is a calculated probability that the user will not abuse or misuse assigned access permissions. For example, a mutually exclusive rule between assigned permissions prevents particular permissions from being assigned to the same risk-averse role or user.

A risk exists that a user may misuse or abuse assigned permissions, yet these assigned permissions enable the user to access secure resources of an enterprise or organization to perform assigned work or tasks. Consequently, illustrative embodiments take into consideration three metrics when generating a role-based access control policy. First, does the role-based access control policy enable a user to perform the user's assigned work? This metric maximizes the number of permissions assigned to a user because the more permissions that the user is assigned, the more work the user is able perform and the greater the benefit to the enterprise or organization.

The second metric that illustrative embodiments consider is the complexity and administrative cost of the role-based access control policy. The complexity or size of the role-based access control policy is determined by the number of permissions, the number of users, the number of roles, and/or the number of user-role and permission-role assignments within the role-based access control policy. The administrative cost is a measure of the system administrator's time required to maintain the role-based access control policy. For example, larger, more complex role-based access control policies are more difficult for the system administrator to maintain and errors are more likely to occur.

Third, illustrative embodiments consider the level of risk that the role-based access control policy poses to the safety and security of the secure resources. For example, granting excess permissions to a user increases a probability of misuse, abuse, and fraud. The user may accomplish fraud by combining multiple permissions together. However, this third risk metric is in direct conflict with the first metric that maximizes the number of permissions assigned to a user or risk-averse role and is orthogonal to the second metric that decreases administrative cost.

Further, illustrative embodiments utilize three notions of risk while performing optimizations. The first notion of risk is a measure of the expected utility compared with the risk of the access control policy changes. For example, the benefit of granting an access permission or decreasing the complexity of the role-based access control policy is greater than the risk associated with making the changes to the role-based access control policy. Expected utility risk is a risk neutral approach that does not favor one optimization criterion over another.

The second notion of risk is a risk-averse policy approach. The risk-averse policy approach is a conservative approach that reduces the risk at the expense of a more complex role-based access control policy with limited user permissions. The third notion of risk is independent policy risk. Independent policy risk considers each change to the role-based access control policy independently, such as, for example, for each role in the role-based access control policy. If the risk of a role change exceeds a predefined threshold, then the change is rejected, regardless of the potential benefit (e.g., increasing the number of user permissions or decreasing the complexity of the role-based access control policy). It should be noted that the three notions of risk above imply that these measures may be taken locally at the user, role, or permission level or globally at the policy level.

Also, it should be noted that illustrative embodiments are not restricted to any particular notion of policy risk and should not be limited to those notions provided above. The notions of policy risk provided herein are only meant as examples. The exact definition of policy risk may depend, for example, on the domain of the role-based access control policy, the particular enterprise or organization, the enterprise or organization's risk posture, local laws and conventions, and limits on liability. Illustrative embodiments may utilize any risk function that is a monotonically non-decreasing risk function with regard to the number of users and the number of permissions assigned to a role-based access control policy. A monotonically non-decreasing risk function states that if a user is assigned more permissions either through assignment of more roles to the user or assignment of more permissions to roles already assigned to the user, then the risk of the role-based access control policy cannot decrease.

Illustrative embodiments may apply a role mining application, such as, for example, HierarchicalMiner, FastMiner, or CompleteMiner, to existing user-permission data to generate a set of candidate roles. These candidate roles may be considered as a set of permissions. Illustrative embodiments may apply a heuristic algorithm or a greedy algorithm to select an appropriate subset of candidate roles to include in the role-based access control policy, as well as to select which users to assign to which roles. The selection of these candidate roles to include in the role-based access control policy depends on a number of criteria, such as the weighted sum of the difference between the user-permission assignments in the input data and the resulting role-based access control policy, the complexity of the role-based access control policy, and the minimization of the aggregate risk of the role-based access control policy. When independent policy risk constraints are desired, any role assignment that causes the risk to exceed a predefined risk threshold level is rejected.

Illustrative embodiments may apply a greedy algorithm to the set of candidate roles such that the candidate roles minimize the cost function. Illustrative embodiments add candidate roles to the role-based access control policy in the order of the improvement (i.e., in a greedy manner) until adding additional candidate roles cannot decrease the cost function of the role-based access control policy. For example, illustrative embodiments add candidate roles to the role-based access control policy until adding additional risk-averse roles increases the risk more than decreases the distance or complexity of the role-based access control policy or the total aggregate risk is greater than the predefined risk threshold, which is the total aggregate risk the role-based access control policy can withstand. This process of applying a greedy algorithm is useful in instances when the notion of a risk budget exists.

Alternatively, illustrative embodiments may apply a data mining and machine learning process to the existing access control policies, user access logs, user trust data, and permission sensitivity data to generate a role-based access control policy that satisfies multiple objectives, such as, for example, the ability of the newly generated role-based access control policy to express observed access control logs, while minimizing the operational risk of the newly generated role-based access control policy. Illustrative embodiments may use machine learning techniques, such as latent Dirichlet allocation (LDA) modeling and author-topic modeling, to mine risk-averse roles that show actually observed usage to probabilistically generate role-based access control policies. Illustrative embodiments may detect and correct over-provisioning errors in a role-based access control policy by identifying anomalies and inconsistencies. An over-provisioning error may be, for example, assigning a number of permissions to a candidate role that exceeds a predefined threshold level, assigning a number of users to a candidate role that exceeds a predefined threshold level, or assigning mutually exclusive access permissions to a same candidate role.

Illustrative embodiments may utilize an iterative process to identify access control policies that minimize risk of misuse of user-permission assignments. These illustrative embodiments mine access control data to generate a role-based access control policy and then perform a risk assessment on the newly generated role-based access control policy. If the risk assessment of the role-based access control policy is greater than a predefined risk threshold level, then these illustrative embodiments repeat the iterative process using further optimization constraints on the mining process until a role-based access control policy is generated with a calculated risk level below the predefined risk threshold. During each iterative step, the original cost is compared with the cost after a change, where the risk after the change is the original risk with the inclusion of a role or an assignment from the set of candidate roles.

The set of candidate roles are selected using a role-mining algorithm on the stored access control policy. Candidate roles exceeding a given risk threshold are discarded. An aggregated risk of candidate roles added to the generated role-based access control policy may not be greater than a specified risk threshold. Further, a ratio between a calculated risk of candidate roles added to the generated role-based access control policy and a calculated complexity of the generated role-based access control policy may not be greater than a predefined ratio threshold.

For multi-objective optimizations, instead of using a set of candidate roles and a greedy algorithm or a heuristic algorithm, illustrative embodiments use a machine learning algorithm to directly generate multi-assignment clustering of users to risk-averse roles and risk-averse roles to permissions, which optimizes multiple objectives. Then, illustrative embodiments may use a set of optimization criteria and apply, for example, a simulated annealing, gradient descent, or other approximation process to minimize the cost function by decreasing risk, complexity, and assignments in the role-based access control policy. If illustrative embodiments approach the role mining process as a matrix factorization process, then the risk becomes the regularizer intended to prevent the over-provisioning of assignments in the role-based access control policy.

Thus, illustrative embodiments provide a computer system and computer program product for generating role-based access control policies that minimize a risk profile of resulting risk-averse roles and assignments to those risk-averse roles. A computer generates a user-permission relation from a stored access control policy by extracting users and permissions assigned to each of the users from the stored access control policy. Then, the computer generates a user-attribute relation by mapping the users to attributes describing each of the users. In addition, the computer generates a permission-attribute relation by mapping the permissions to attributes describing each of the permissions. Afterward, the computer determines the set of risk-averse roles, assignment of the set of risk-averse roles to the users, and assignment of the permissions to the set of risk-averse roles based on applying a risk-optimization function to the generated user-permission relation, the generated user-attribute relation, and the generated permission-attribute relation.

The risk-optimization function is a multiple-objective optimization function that minimizes risk of misuse of user-permission assignments while minimizing complexity of the generated role-based access control policy and a number of changes to the user-permission assignments from the stored access control policy to the generated role-based access control policy. The risk-optimization function also may be a weighted combination of the risk of misuse of user-permission assignments, the complexity of the generated role-based access control policy, and the number of changes to the user-permission assignments from the stored access control policy to the generated role-based access control policy. The risk-optimization function also maps the attributes describing each of the users and the attributes describing each of the permissions to a specific risk level. The risk-optimization function generates a permission to role assignment from the user-permission input as part of the risk optimization process.

Subsequently, the computer generates a role-based access control policy that minimizes a risk profile of the set of risk-averse roles, the assignment of the set of risk-averse roles to the users, and the assignment of the permissions to the set of risk-averse roles. Risk of the generated role-based access control policy may be calculated using an aggregation function that aggregates a risk of each risk-averse role in the set of risk-averse roles. The aggregation function is a monotonically non-decreasing function. The risk of the generated role-based access control policy also may be calculated based on aggregating a risk of each of the users in the generated role-based access control policy given all risk-averse roles assigned to each of the users. However, it should be noted that the above are only a few the many different ways to calculate policy risk. For example, an alternative illustrative embodiment may calculate the policy risk without taking into account each individual role.

Risk of misuse of user-permission assignments in a risk-averse role may be calculated based on an aggregation of the attributes describing each of the users and the attributes describing each of the permissions assigned to the risk-averse role, for example. The attributes describing each of the users used in calculating the risk of misuse of user-permission assignments in the risk-averse role may include at least one of a security clearance level and an access risk level of a user, for example. The attributes describing each of the permissions used in calculating the risk of misuse of user-permission assignments in the risk-averse role may include at least one of a sensitivity level and an access risk level of a permission, for example. As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. In other words, at least one of means any combination of items and number of items may be used from the list but not all of the items in the list are required. Also, it should be noted that illustrative embodiments may utilize other types of attributes when calculating the risk of misuse of user-permission assignments.

Risk of a role assignment may be calculated using, for example, an aggregation of sensitivity levels of the permissions assigned to the risk-averse role and an aggregation of security clearance levels of the users assigned to the risk-averse role. The aggregation of the sensitivity levels of the permissions and the aggregation of the security clearance levels of the users is calculated using a monotonically non-decreasing function. The monotonically non-decreasing function may be defined by applying a normalized integral to an existing membership function. However, it should be noted that illustrative embodiments may utilize other criteria when calculating the risk of role assignments.

With reference now to FIG. 3, a diagram illustrating an example of an access control policy system is depicted in accordance with an illustrative embodiment. Access control policy system 300 may be, for example, implemented in a data processing system, such as data processing system 200 in FIG. 2. Access control policy system 300 is a system of hardware and software components that generate role-based access control policies, such as role-based access control policies 228 in FIG. 2.

Access control policy system 300 includes policy risk modeling device 302. Policy risk modeling device 302 is a computer device, such as, for example, server computer 104 or client computer 110 in FIG. 1. In this example, policy risk modeling device 302 includes risk analysis component 304, application programming interface (API) 306, role and policy modeling component 308, and role-based access control policy database 310. Of course it should be noted that policy risk modeling device 302 may include more or fewer components depending on the different illustrative embodiments.

Risk analysis component 304 is a software application that analyzes the risk of a role-based access control policy. Alternatively, risk analysis component 304 may analyze the risk associated with individual components of the role-based access control policy, such as the risk of each user, role, permission, and/or assignment included within the role-based access control policy. Application programming interface 306 is an application programming interface that allows communication between risk analysis component 304 and role and policy modeling component 308. Role and policy modeling component 308 is a software application that retrieves access control data, such as previous access control policies and/or access control logs, in order to generate role-based access control policies. Role-based access control policy database 310 is a storage device, such as persistent storage 208 in FIG. 2, which stores the newly generated role-based access control policies and other calculated access control data results.

Risk analysis component 304 is distinct from role and policy modeling component 308 and uses application programming interface 306 to query the underlying role-based access control policy models to find access control policy data. Role and policy modeling component 308 retrieves access control data input 312 from a storage device, such as, for example, storage 108 in FIG. 1. Access control data input 312 includes access control policies/access control logs data 314. Access control policies/access control logs data 314 represents access control policies previously implemented by an enterprise or organization and/or access control logs of user access to secure resources of the enterprise or organization. Access control policies/access control logs data 314 includes permission attributes 316 and user attributes 318. In addition, access control policies/access control logs data 314 also may include users, permissions, and user-permission assignments. Role and policy modeling component 308 utilizes access control data input 312 to generate role-based access control policies.

Permission attributes 316 and user attributes 318 may include a sensitivity level for each individual permission and a user access risk level for each individual user, respectively. These sensitivity levels and access risk levels may be, for example, predefined, distinct notional levels, such as, high, elevated, moderate, and low or may be integer values from 1 through 100 where the notional values may correspond to integer values of 80, 60, 40, and 20, respectively. Typically, the system administrator determines the sensitivity levels and access risk levels from other attributes, such as the level of training of the users, job title of the users within an enterprise or organization, geographic location of the users, etc. The system administrator manually enters the sensitivity levels and the access risk levels as attributes. Alternatively, policy risk modeling device 302 may automatically determine the sensitivity levels and the access risk levels from the other attributes.

When invoked on a generated role-based access control policy or a set of generated role-based access control policies from role and policy modeling component 308, risk analysis component 304 calculates the aggregate risk levels for each risk-averse role in a given role-based access control policy, using an aggregation and inferencing process. Then, risk analysis component 304 stores the calculated risk level results in role-based access control policy database 310. The results of the risk analysis are stored as attributes of the risk-averse role for the given role-based access control policy. In addition, risk analysis component 304 presents the risk analysis results using visualization 320 within display 322, such as display 214 in FIG. 2, to an end user, such as a system administrator, for review. It should be noted that risk analysis component 304 does not monitor role-based access control policy for changes. As a result, a system administrator must explicitly invoke risk analysis component 304 when such changes occur.

A central component of risk management is to assess the risk resulting from the implemented access controls (i.e., the access control policy that is currently implemented by an enterprise or organization). If the risk assessment step shows that that the currently implemented access control policy results in too much risk to the secure resources of the enterprise or organization, such as secure resources 116 in FIG. 1, policy risk modeling device 302 mitigates the risk by generating a role-based access control policy that decreases the risk.

Role and policy modeling component 308 automatically mines a role-based access control policy from access control policies/access control logs data 314 where the resulting role-based access control policy has a risk bounded by a pre-defined threshold. Risk analysis component 304 assesses the risk in a role-based access control policy such that the role-based access control policy satisfies the property of monotonicity. In other words, if a user is assigned more permissions through the assignment of more roles or the assignment of more permissions to roles already assigned to the user, then the risk of the role-based access control policy can not decrease.

In addition, risk analysis component 304 also may assess risk of assignments based on the sensitivity level of permissions and the security clearance level of users. Risk analysis component 304 aggregates the sensitivity levels of the permissions assigned to a role and the security clearance levels of the users assigned a role. The calculated risk of the entire role-based access control policy is the aggregation of the risk of each individual role assignment in the role-based access control policy. Risk analysis component 304 utilizes mathematical functions for aggregating the permission sensitivity levels, the user security clearance levels, and the user access risk levels.

Risk analysis component 304 utilizes a greedy algorithm to consider at each iterative step only those candidate roles that do not increase the resulting overall risk level of the role-based access control policy beyond the predefined threshold. Alternatively, risk analysis component 304 may use a matrix factorization process to include risk optimization criteria constraints to optimize the role-based access control policy. Risk analysis component 304 performs optimization of the role-based access control policy at each iterative step at a local level to improve the assignments of permissions to risk-averse roles and the assignments of risk-averse roles to users. Risk analysis component 304 uses this local optimization process to favor assignments that increase the risk by the smallest amount.

Risk captures the impact of a potential vulnerability in a system being exploited by a potential threat. Generally, estimating risk involves characterizing the components of the information technology (IT) system, the threats to each of the system components, the operational controls that are deployed on each system component, assessing whether the identified potential threats can compromise the system, and the potential cost of the resulting damage to the system.

Policy risk is the quantification of the impact of misuse of the permissions assigned to users. Access control policies should reflect the principle of least privilege (i.e., users are only granted those permissions that enable the users to perform their respective work and in turn users use these permissions to perform only those tasks that are required for their respective work). The most common cause of risk in an access control policy is a user who misuses or abuses the permissions assigned to the user either willfully or through the loss or disclosure of credentials, which are then used by another person or a piece of malware. Another source of risk in an access control policy is that of mistakenly assigning users certain privileges. For instance, if a user is assigned root-user access to a system, then even benign actions by the user may cause considerable unintended damage to the system. Further, general violations of the least privilege principle may arise in the context of role-based access control policies when too many permissions are assigned to a risk-averse role, a user is assigned too many risk-averse roles, etc.

It should be noted that if a permission is assigned to more users, then the probability of misuse is now the probability that any one of the users assigned this permission will misuse it. Thus, the risk of the resulting access control policy is now potentially higher. However, assume that in an access control policy every user in a set of users has at least one permission and every permission in the set of all permissions is assigned to at least one user. The set of all permissions that a user is authorized for includes both the permissions the user acquired from the user's role memberships and the permissions that are directly assigned to the user.

Instead of assigning risk globally at the policy level, risk analysis component 304 also may assign risk locally at the role level. Then the risk of the policy is simply the aggregation of the risk of each individual role. However, risk analysis component 304 may perform risk aggregation in many ways. For example, risk analysis component 304 may define the policy risk as the largest risk of any individual role.

In addition, role and policy modeling component 308 may assign a sensitivity value to each permission and a security clearance value to each user and define aggregation functions that will calculate the sensitivity level of a set of permissions and the security clearance level of a set of users. Finally, for each sensitivity value and each security clearance value, risk analysis component 304 assigns a risk value. Risk analysis component 304 calculates the risk of a risk-averse role by first computing the aggregate sensitivity level of the permissions assigned to the risk-averse role, the aggregate security clearance level of the users who are assigned the risk-averse role and then assessing the risk of the assignment.

A key to integrating risk metrics into the role mining process is the use of a prioritization process that trades off the benefit of aggregating permissions into risk-averse roles with the risk of risk-averse roles that grow excessively large, optimization criteria that reject risk-averse roles that represent an unacceptable level of risk regardless of the perceived benefits, and a modification process that alters the candidate roles to make risk/benefit tradeoffs, which a candidate role mining algorithm does not consider.

The prioritization process should select the "next best" role given the optimization criteria, trading off the benefits of adding the risk-averse role with the risks the risk-averse role poses. For prioritization, role and policy modeling component 308 uses a weighted cost metric and a return on investment benefit function. To calculate the cost, role and policy modeling component 308 selects a weighted sum of the complexity and risk of the role-based access control policy. To calculate the benefit, role and policy modeling component 308 selects the total number of permissions assigned to the additional risk-averse role. When permission usage information is available, role and policy modeling component 308 can weight the benefit by the frequency an assignment is used in practice, as a representation of the amount of work the assignments enable the user to perform. The prioritization is a ratio of the benefit and cost or the return on risk and complexity investment.

When scoring candidate roles, role and policy modeling component 308 considers many criteria, such as the benefit of adding the candidate role (e.g., user-permission assignments that may be covered), prior to calculating the role risk. During the benefit calculation stage, role and policy modeling component 308 may assign some permissions only to a small number of potential candidate users. Permissions assigned to a candidate role that do not aid in covering new user-permission assignments may easily be removed from the candidate role to reduce the aggregate sensitivity and risk of the candidate role. Similarly, users that observe no gains (e.g., no new permissions are covered by the candidate role), should not be assigned the candidate role. When permissions are pruned from candidate roles, role and policy modeling component 308 may increase potential user scores and add new users to the candidate role without risk of over-assigning users new permissions.

Figure 4:
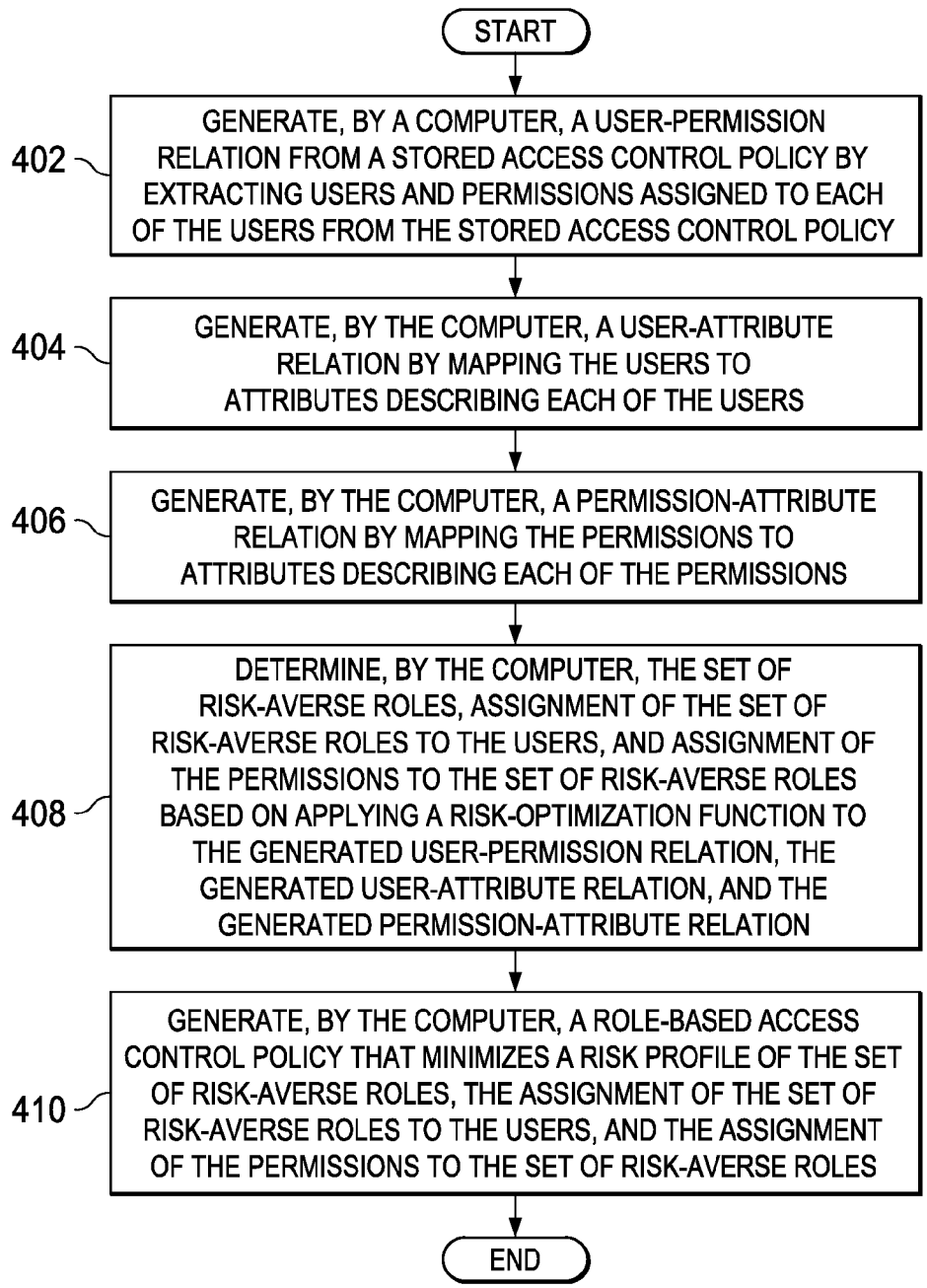
FIG. 4 is a flowchart illustrating a process for generating a role-based access control policy using a set of risk-averse roles in accordance with an illustrative embodiment.

With reference now to FIG. 4, a flowchart illustrating a process for generating a role-based access control policy using a set of risk-averse roles is shown in accordance with an illustrative embodiment. The process shown in FIG. 4 may be implemented in a computer, such as, for example, data processing system 200 in FIG. 2.

The process begins when the computer generates a user-permission relation from a stored access control policy by extracting users and permissions assigned to each of the users from the stored access control policy (step 402). Also, it should be noted that the computer may utilize, for example, stored access control logs in addition to or instead of the stored access control policy to generate the user-permission relation. Further, the computer generates a user-attribute relation by mapping the users to attributes describing each of the users (step 404).

Furthermore, the computer generates a permission-attribute relation by mapping the permissions to attributes describing each of the permissions (step 406). Moreover, the computer determines the set of risk-averse roles, assignment of the set of risk-averse roles to the users, and assignment of the permissions to the set of risk-averse roles based on applying a risk-optimization function to the generated user-permission relation, the generated user-attribute relation, and the generated permission-attribute relation (step 408). Then, the computer generates a role-based access control policy that minimizes a risk profile of the set of risk-averse roles, the assignment of the set of risk-averse roles to the users, and the assignment of the permissions to the set of risk-averse roles (step 410).

Figure 5:
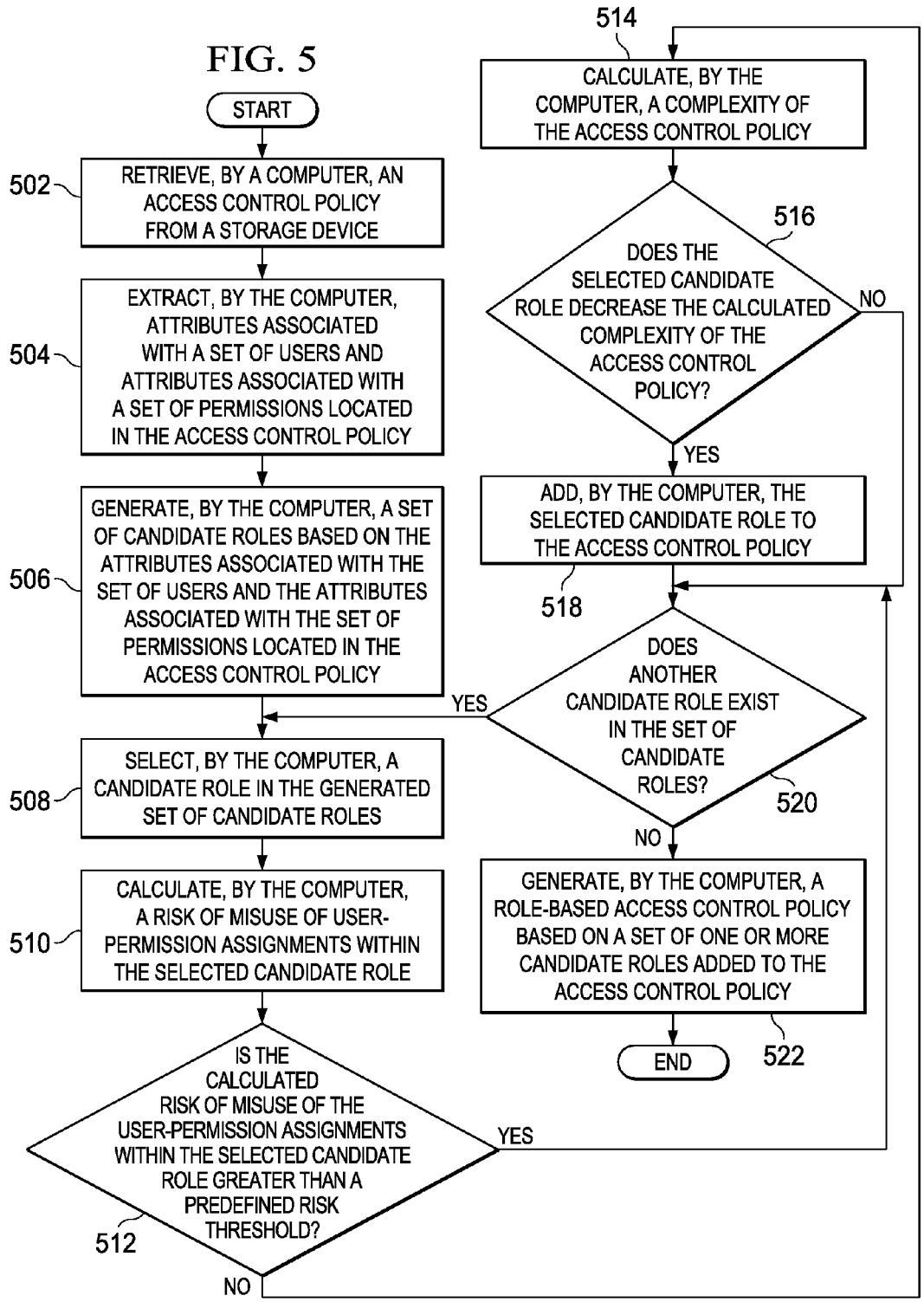
FIG. 5 is a flowchart illustrating a process for generating a role-based access control policy based on a set of candidate roles added to an access control policy in accordance with an illustrative embodiment.

With reference now to FIG. 5, a flowchart illustrating a process for generating a role-based access control policy based on a set of candidate roles added to an access control policy is shown in accordance with an illustrative embodiment. The process shown in FIG. 5 may be implemented in a computer, such as, for example, data processing system 200 in FIG. 2.

The process begins when the computer retrieves an access control policy from a storage device (step 502). Then, the computer extracts attributes associated with a set of users and attributes associated with a set of permissions located in the access control policy (step 504). Afterward, the computer generates a set of candidate roles based on the attributes associated with the set of users and the attributes associated with the set of permissions located in the access control policy (step 506).

Subsequently, the computer selects a candidate role in the generated set of candidate roles (step 508). Then, the computer calculates a risk of misuse of user-permission assignments within the selected candidate role (step 510). Afterward, the computer makes a determination as to whether the calculated risk of misuse of the user-permission assignments within the selected candidate role is greater than a predefined risk threshold (step 512). If the computer determines that the calculated risk of misuse of the user-permission assignments within the selected candidate role is greater than the predefined risk threshold, yes output of step 512, then the process proceeds to step 520. If the computer determines that the calculated risk of misuse of the user-permission assignments within the selected candidate role is not greater than the predefined risk threshold, no output of step 512, then the computer calculates a complexity of the access control policy (step 514).

Subsequently, the computer makes a determination as to whether the selected candidate role decreases the calculated complexity of the access control policy (step 516). If the computer determines that the selected candidate role does not decrease the calculated complexity of the access control policy, no output of step 516, then the process proceeds to step 520. If the computer determines that the selected candidate role does decrease the calculated complexity of the access control policy, yes output of step 516, then the computer adds the selected candidate role to the access control policy (step 518).

Afterward, the computer makes a determination as to whether another candidate role exists in the set of candidate roles (step 520). If the computer determines that another candidate role does exist in the set of candidate roles, yes output of step 520, then the process returns to step 508 where the computer selects the next candidate role. If the computer determines that another candidate role does not exist in the set of candidate roles, no output of step 520, then the computer generates a role-based access control policy based on a set of one or more candidate roles added to the access control policy (step 522). The process terminates thereafter.

Figure 6B:
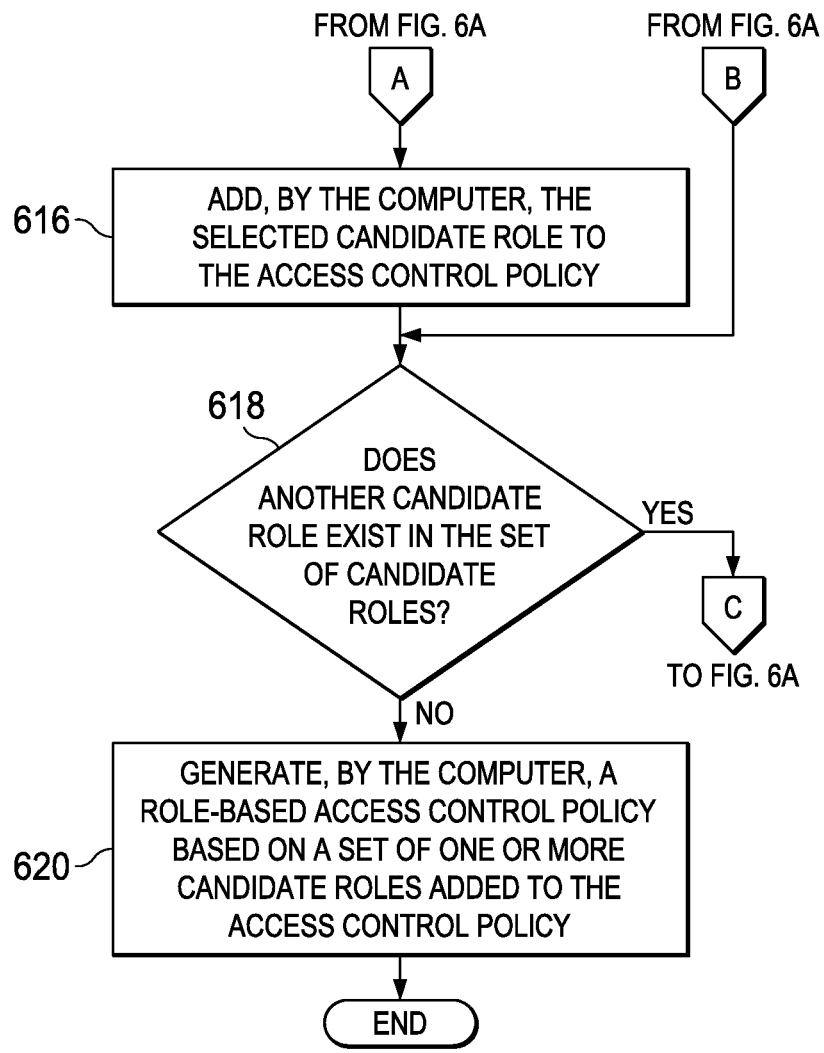

With reference now to FIG. 6A and FIG. 6B, a flowchart illustrating another process for generating a role-based access control policy based on a set of candidate roles added to an access control policy is shown in accordance with an illustrative embodiment. The process shown in FIGS. 6A and 6B may be implemented in a computer, such as, for example, data processing system 200 in FIG. 2.

The process begins when the computer retrieves an access control policy from a storage device (step 602). Then, the computer extracts attributes associated with a set of users and attributes associated with a set of permissions located in the access control policy (step 604). Afterward, the computer generates a set of candidate roles based on the attributes associated with the set of users and the attributes associated with the set of permissions located in the access control policy (step 606).

Subsequently, the computer selects a candidate role in the generated set of candidate roles (step 608). Then, the computer calculates a risk of misuse of user-permission assignments within the selected candidate role (step 610). In addition, the computer calculates an aggregated risk of misuse of user-permission assignments within the access control policy (step 612).

Afterward, the computer makes a determination as to whether the selected candidate role decreases the aggregated risk of misuse of user-permission assignments within the access control policy based on the calculated risk of misuse of user-permission assignments within the selected candidate role (step 614). If the computer determines that the selected candidate role does not decrease the aggregated risk of misuse of user-permission assignments within the access control policy based on the calculated risk of misuse of user-permission assignments within the selected candidate role, no output of step 614, then the process proceeds to step 618. If the computer determines that the selected candidate role does decrease the aggregated risk of misuse of user-permission assignments within the access control policy based on the calculated risk of misuse of user-permission assignments within the selected candidate role, yes output of step 614, then the computer adds the selected candidate role to the access control policy (step 616).

Subsequently, the computer makes a determination as to whether another candidate role exists in the set of candidate roles (step 618). If the computer determines that another candidate role does exist in the set of candidate roles, yes output of step 618, then the process returns to step 608 where the computer selects the next candidate role. If the computer determines that another candidate role does not exist in the set of candidate roles, no output of step 618, then the computer generates a role-based access control policy based on a set of one or more candidate roles added to the access control policy (step 620). The process terminates thereafter.

Figure 7B:
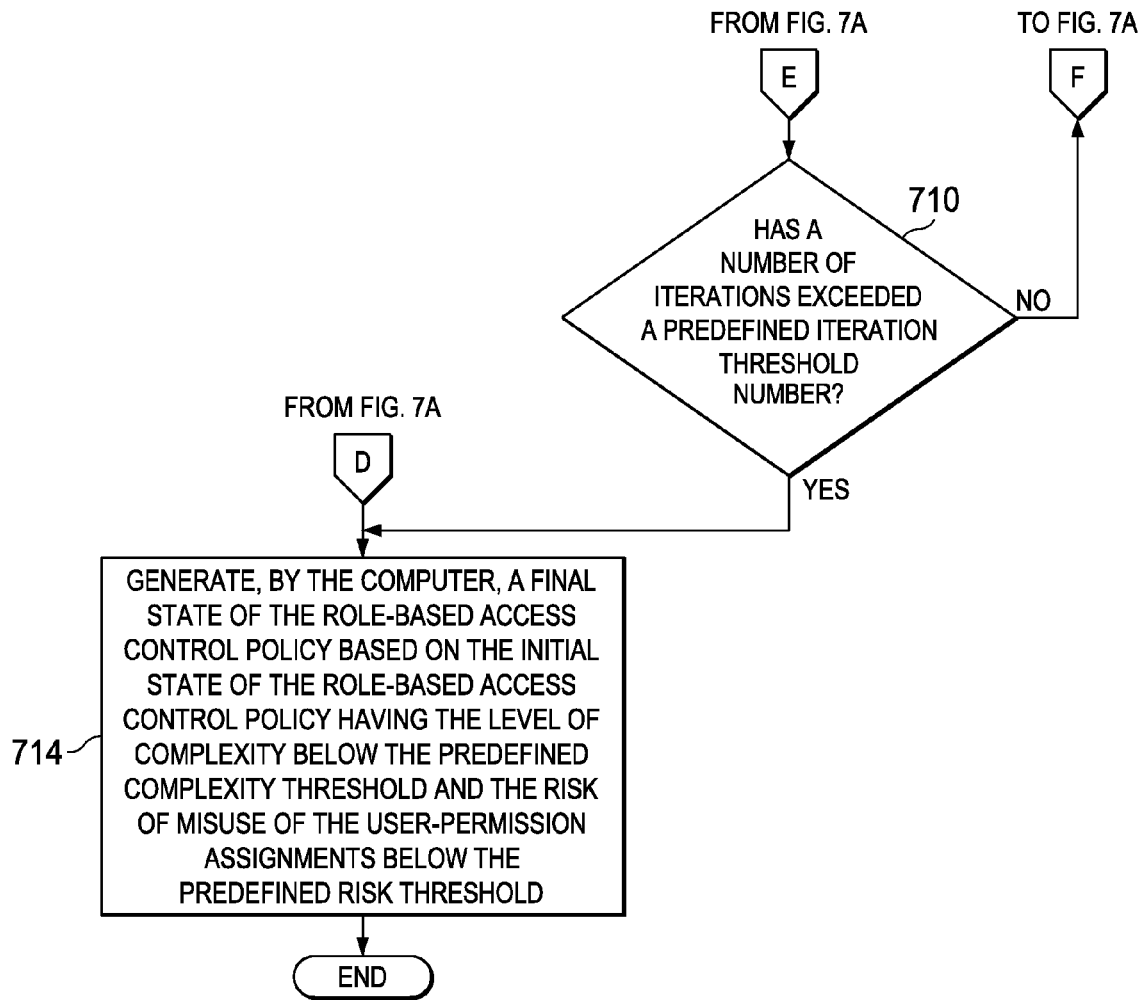

With reference now to FIG. 7A and FIG. 7B, a flowchart illustrating a process for generating a role-based access control policy based on an initial role-based access control policy generated by a machine learning application is shown in accordance with an illustrative embodiment. The process shown in FIGS. 7A and 7B may be implemented in a computer, such as, for example, data processing system 200 in FIG. 2.

The process begins when the computer retrieves an access control policy from a storage device (step 702). Then, the computer generates an initial state of a role-based access control policy using a machine learning application that determines a set of users, a set of permissions, and user-permission assignments based on the retrieved access control policy (step 704). Further, the computer applies an optimization function to the initial state of the role-based access control policy to decrease a level of complexity of the initial state of the role-based access control policy and decrease a risk of misuse of the user-permission assignments within the initial state of the role-based access control policy (step 706).

Afterward, the computer makes a determination as to whether the level of complexity of the initial state of the role-based access control policy is greater than a predefined complexity threshold (step 708). If the computer determines that the level of complexity of the initial state of the role-based access control policy is greater than the predefined complexity threshold, yes output of step 708, then the computer makes a determination as to whether a number of iterations exceeded a predefined iteration threshold number (step 710). If the computer determines that the number of iterations has not exceeded the predefined iteration threshold number, no output of step 710, then the process returns to step 706 where the computer applies the optimization function to the policy once again. If the computer determines that the number of iterations has exceeded the predefined iteration threshold number, yes output of step 710, then the process proceeds to step 714.

Returning again to step 708, if the computer determines that the level of complexity of the initial state of the role-based access control policy is not greater than the predefined complexity threshold, no output of step 708, then the computer makes a determination as to whether the risk of misuse of the user-permission assignments within the initial state of the role-based access control policy is greater than a predefined risk threshold (step 712). If the computer determines that the risk of misuse of the user-permission assignments within the initial state of the role-based access control policy is greater than the predefined risk threshold, yes output of step 712, then the process returns to step 710 where the computer determines whether the number of iterations exceeded the predefined iteration threshold number. If the computer determines that the risk of misuse of the user-permission assignments within the initial state of the role-based access control policy is not greater than the predefined risk threshold, no output of step 712, then the computer generates a final state of the role-based access control policy based on the initial state of the role-based access control policy having the level of complexity below the predefined complexity threshold and the risk of misuse of the user-permission assignments below the predefined risk threshold (step 714). The process terminates thereafter.

Thus, illustrative embodiments provide a computer system and computer program product for generating a role-based access control policy. The descriptions of the various illustrative embodiments have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the figures illustrate the architecture, functionality, and operation of possible implementations of computer systems, computer implemented methods, and computer program products according to various illustrative embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer system for generating role-based access control policies that minimize a risk profile of resulting risk-averse roles and assignments to those risk-averse roles, the computer system comprising:
 a bus system;
 a storage device connected to the bus system, wherein the storage device stores computer readable program code; and
 a processor unit connected to the bus system, wherein the processor unit executes the computer readable program code to generate a user-permission relation from a stored access control policy by extracting users and permissions assigned to each of the users from the stored access control policy, wherein the user-permission relation defines a relationship between the users and their assigned permissions to access secure resources connected to a network to perform their assigned duties, and wherein a permission grants a user assigned to that permission an ability to at least one of read a secure document, write to a secure document, delete a secure document, modify a secure document, access a secure hardware device, access a secure software application, and access a secure network; generate a user-attribute relation by mapping the users to attributes describing each of the users; generate a permission-attribute relation by mapping the permissions to attributes describing each of the permissions; determine a set of risk-averse roles, assignment of the set of risk-averse roles to the users, and assignment of the permissions to the set of risk-averse roles based on applying a risk-optimization function to the generated user-permission relation, the generated user-attribute relation, and the generated permission-attribute relation, wherein a risk-averse role includes a set of users with their assigned permissions to perform their assigned duties on the secure resources and has a level of risk associated with the risk-averse role; generate a role-based access control policy that minimizes a risk profile of the set of risk-averse roles, the assignment of the set of risk-averse roles to the users, and the assignment of the permissions to the set of risk-averse roles; wherein risk of misuse of user-permission assignments in a risk-averse role is calculated based on an aggregation of the attributes describing each of the users and the attributes describing each of the permissions assigned to the risk-averse role, and wherein the attributes describing each of the users used in calculating the risk of misuse of user-permission assignments in the risk-averse role include a security clearance level of a user that corresponds to a security clearance value for the user, and wherein the attributes describing each of the permissions used in calculating the risk of misuse of user-permission assignments in the risk-averse role include a sensitivity level of a permission that defines a level of damage caused by at least one of an abuse and a misuse of the permission by the user; and control the access to the secure resources by the users using the generated role-based access control policy to mitigate the risk to the secure resources.

2. The computer system of claim 1, wherein the risk-optimization function is a multiple-objective optimization function that minimizes risk of misuse of user-permission assignments while minimizing complexity of the generated role-based access control policy and a number of changes to the user-permission assignments from the stored access control policy to the generated role-based access control policy, wherein the complexity of the generated role-based access control policy is determined by a number of permissions, a number of users, a number of risk-averse roles, a number of user-role assignments, and a number of permission-role assignments within the generated role-based access control policy.

3. The computer system of claim 2, wherein the risk-optimization function is a weighted combination of the risk of misuse of user-permission assignments, the complexity of the generated role-based access control policy, and the number of changes to the user-permission assignments from the stored access control policy to the generated role-based access control policy.

4. The computer system of claim 3, wherein risk of the generated role-based access control policy is calculated using an aggregation function that aggregates a risk of each risk-averse role in the set of risk-averse roles.

5. The computer system of claim 4, wherein the aggregation function is a monotonically non-decreasing function.

6. The computer system of claim 5, wherein the risk of the generated role-based access control policy is calculated based on aggregating a risk of each of the users in the generated role-based access control policy given all risk-averse roles assigned to each of the users.

7. The computer system of claim 1, wherein the risk-optimization function maps the attributes describing each of the users and the attributes describing each of the permissions to a specific risk level.

8. The computer system of claim 1, wherein risk of a role assignment is calculated using an aggregation of sensitivity levels of the permissions assigned to the risk-averse role and an aggregation of security clearance levels of the users assigned to the risk-averse role.

9. The computer system of claim 8, wherein the aggregation of the sensitivity levels of the permissions and the aggregation of the security clearance levels of the users is calculated using a monotonically non-decreasing function that cannot decrease a risk of the generated role-based access control policy in response to a user being assigned more permissions by at least one of assignment of more risk-averse roles to the user and assignment of more permissions to risk-averse roles already assigned to the user.

10. The computer system of claim 9, wherein the monotonically non-decreasing function is defined by applying a normalized integral to an existing membership function.

11. A computer program product stored on a computer readable storage medium having computer readable program code encoded thereon that is executable by a computer for generating role-based access control policies that minimize a risk profile of resulting risk-averse roles and assignments to those risk-averse roles, the computer program product comprising:

computer readable program code for generating a user-permission relation from a stored access control policy by extracting users and permissions assigned to each of the users from the stored access control policy, wherein the user-permission relation defines a relationship between the users and their assigned permissions to access secure resources connected to a network to perform their assigned duties, and wherein a permission grants a user assigned to that permission an ability to at least one of read a secure document, write to a secure document, delete a secure document, modify a secure document, access a secure hardware device, access a secure software application, and access a secure network;

computer readable program code for generating a user-attribute relation by mapping the users to attributes describing each of the users;

computer readable program code for generating a permission-attribute relation by mapping the permissions to attributes describing each of the permissions;

computer readable program code for determining a set of risk-averse roles, assignment of the set of risk-averse roles to the users, and assignment of the permissions to the set of risk-averse roles based on applying a risk-optimization function to the generated user-permission relation, the generated user-attribute relation, and the generated permission-attribute relation, wherein a risk-averse role includes a set of users with their assigned permissions to perform their assigned duties on the secure resources and has a level of risk associated with the risk-averse role;

computer readable program code for generating a role-based access control policy that minimizes a risk profile of the set of risk-averse roles, the assignment of the set of risk-averse roles to the users, and the assignment of the permissions to the set of risk-averse roles; wherein risk of misuse of user-permission assignments in a risk-averse role is calculated based on an aggregation of the attributes describing each of the users and the attributes describing each of the permissions assigned to the risk-averse role, and wherein the attributes describing each of the users used in calculating the risk of misuse of user-permission assignments in the risk-averse role include a security clearance level of a user that corresponds to a security clearance value for the user, and wherein the attributes describing each of the permissions used in calculating the risk of misuse of user-permission assignments in the risk-averse role include a sensitivity level of a permission that defines a level of damage caused by at least one of an abuse and a misuse of the permission by the user; and computer readable program code for controlling the access to the secure resources by the users using the generated role-based access control policy to mitigate the risk to the secure resources.

12. The computer program product of claim 11, wherein the risk-optimization function is a multiple-objective optimization function that minimizes risk of misuse of user-permission assignments while minimizing complexity of the generated role-based access control policy and a number of changes to the user-permission assignments from the stored access control policy to the generated role-based access control policy, wherein the complexity of the generated role-based access control policy is determined by a number of permissions, a number of users, a number of risk-averse roles, a number of user-role assignments, and a number of permission-role assignments within the generated role-based access control policy.

13. The computer program product of claim 12, wherein the risk-optimization function is a weighted combination of the risk of misuse of user-permission assignments, the complexity of the generated role-based access control policy, and the number of changes to the user-permission assignments from the stored access control policy to the generated role-based access control policy.

14. The computer program product of claim 13, wherein risk of the generated role-based access control policy is calculated using an aggregation function that aggregates a risk of each risk-averse role in the set of risk-averse roles.

15. The computer program product of claim 14, wherein the aggregation function is a monotonically non-decreasing function.

16. The computer program product of claim 15, wherein the risk of the generated role-based access control policy is calculated based on aggregating a risk of each of the users in the generated role-based access control policy given all risk-averse roles assigned to each of the users.

17. The computer program product of claim 11, wherein the risk-optimization function maps the attributes describing each of the users and the attributes describing each of the permissions to a specific risk level.

18. The computer program product of claim 11, wherein risk of a role assignment is calculated using an aggregation of sensitivity levels of the permissions assigned to the risk-averse role and an aggregation of security clearance levels of the users assigned to the risk-averse role.

19. The computer program product of claim 18, wherein the aggregation of the sensitivity levels of the permissions and the aggregation of the security clearance levels of the users is calculated using a monotonically non-decreasing function that cannot decrease a risk of the generated role-based access control policy in response to a user being assigned more permissions by at least one of assignment of more risk-averse roles to the user and assignment of more permissions to risk-averse roles already assigned to the user.

20. The computer program product of claim 19, wherein the monotonically non-decreasing function is defined by applying a normalized integral to an existing membership function.

* * * * *